(12) United States Patent
Posselius et al.

(10) Patent No.: US 6,804,597 B1
(45) Date of Patent: Oct. 12, 2004

(54) AUTOMATIC GUIDANCE SYSTEM FOR TOWED FARM IMPLEMENTS

(75) Inventors: John H. Posselius, Ephrata, PA (US); James R. Day, Lititz, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/618,958

(22) Filed: Jul. 14, 2003

(51) Int. Cl.[7] .............................................. G06F 19/00
(52) U.S. Cl. ......................................... 701/50; 701/213
(58) Field of Search ........................ 701/50, 213; 172/2

(56) References Cited

U.S. PATENT DOCUMENTS 6,708,080 B2 * 3/2004 Benneweis .................. 700/242
2003/0187560 A1 * 10/2003 Keller et al. .................. 701/50

OTHER PUBLICATIONS

Chad Elmore, "Hands–free steering", OEM Off–Highway, May 2003, vol. 21, No. 4 pp., 14–21.

* cited by examiner

Primary Examiner—Marthe Y. Marc-Coleman
(74) Attorney, Agent, or Firm—John William Stader; Collin A. Webb

(57) ABSTRACT

An apparatus and method for automatically swinging a center pivot, towed implement from one side to the other side of a farm machine. The apparatus includes a Global Positioning System for locating the farm machine and sensors and remote controls for various functions of the machine to check and change the status of each machine function. An on-board computer uses the sensors and the GPS and a previously installed program to automatically determine what portion of the field has been worked and to direct the farm machine to swing the implement from one side to the other as required.

7 Claims, 2 Drawing Sheets

AUTOMATIC GUIDANCE SYSTEM FOR TOWED FARM IMPLEMENTS

BACKGROUND OF THE INVENTION

This invention deals generally with farm equipment and more specifically with an apparatus and method for automatically controlling a swinging implement that tractors tow.

It is somewhat surprising to a layperson to discover that a farm tractor can now be guided by a Global Positioning System (GPS). Such satellite guidance systems are used in conjunction with on-board computers, drive by wire components, and electro-hydraulic controls to automatically guide tractors in straight lines or predetermined routes with specified overlap between sequential parallel passes on a field, even at night or with poor visibility. Guidance systems are now available that can control the positioning of subsequent passes to within 2 centimeters.

However, although several GPS guidance systems can be used to automatically steer a tractor, the operator typically still has a great deal to do at the end of the field, particularly with an implement that swings from one side to the other of the tractor. When pulling a typical center pivot mower-conditioner oriented behind and to one side of the tractor, at the end of the field, in a distance approximating the width of two to four cuts, the operator must perform a great many actions. This includes the need to downshift and/or reduce ground speed, raise the cutting head, turn the tractor 180 degrees, swing the implement to the opposite side of the tractor, align it for proper towing, and then lower the cutting head. Even with GPS guidance aid, the operator must still align the tractor in approximately the correct return path, increase speed, upshift, and lower the cutting head.

Some prior art units operating in conjunction with GPS navigational systems do perform several of these tasks when instructed to do so. Thus, when the operator pushes a single "end of field" button, the tractor speed slows down, the gears downshift, and the implement is raised and its operation stopped. Then, after the operator has turned the tractor and the towed implement around and positioned it in approximately the proper path, the operator pushes another button to reestablish GPS alignment control, increase the tractor speed, and put the implement back into operation. However, the only part the GPS plays in this entire procedure is to guide the tractor and to inform the operator when the tractor has reached the area at the end of the field. The operator is still left with several jobs, such as of turning the tractor, changing the towed implement over to the opposite side, and realigning the towed implement with the tractor.

To better appreciate the problem of mowing a field with a center pivot mower, it is advantageous to understand the traditional procedure for mowing a field. The first step in mowing a field is called "opening the field" in the terminology of the industry. This involves cutting around the circumference of the field, near the boundaries that might be fencing, trees, or somebody else's property. Typically, two to four cutting passes are made around the entire field, each being farther from the edge of the field by the width of the mower. This results in a frame-like area, called the "headlands" in the terminology of the industry, that is fully cut and now available for maneuvering the tractor and towed implement.

It should be appreciated that, in order to minimize the number of times the equipment must be turned around, fields are cut so that the cuts run parallel to the longest sides of the field. However, even the precutting of the ends of the field provides only a minimum space for turning the equipment around, and to add to the difficulty, the cut crop at the end of the field is usually formed into swaths or windrows that should be disturbed, a little as possible.

This requires that the cutting apparatus be lifted off the ground precisely when the mower reaches the edges of the headlands area. The cutting apparatus must be raised, the tractor must then be turned, the towed implement must be moved to the opposite side of the tractor, and the cutting apparatus lowered before it reaches the uncut area again. Furthermore this must all be accomplished in the space of three to four cut widths. Only the most skilled operators have been able to consistently accomplish this procedure quickly and accurately hour after hour.

It would be very beneficial to automate any of these functions, and thus truly leave the operator with only the job of making certain that everything is operating properly. Such a system would permit the operation of the equipment by less skilled personnel and would truly permit safe, low visibility field operations while maximizing the efficiency of the implement.

SUMMARY OF THE INVENTION

The present invention uses the Global Positioning System not only as a guidance system for the parallel runs down a field, but also as an information source to control the actions at the end of the field. Using a super accurate Real Time Kinematic (RTK) GPS that includes a local portable base station, the GPS can locate the tractor to within less than an inch of a desired path. With this capability and the tractor location information transmitted to a computer that records it, the apparatus of the invention knows and can record precisely the tractor's present location and everywhere the tractor has been. It should be noted that the end of field functions operate just as well with the less accurate differential global positioning systems (DGPS).

This means that, for the preferred embodiment using a towed mower, while the first circumferential cut is being made around the edges of the field, the computer is mapping the exact location of the boundaries of the field. Furthermore, with the mower dimensions already entered into the computer and sensors on the tractor and the towed mower to provide information to the computer on the position, operation mode, and orientation of the mower, the computer records the dimensions of the portions of the field that have already been cut. Of course, this also provides the computer with the information needed to determine the exact area and location of the uncut portion of the field enclosed within that first circumferential cut.

It should be appreciated that, although most references in this specification refer to the preferred embodiment of the invention as controlling a center pivot mower towed by a tractor, the same control apparatus is useable with other farm implements that independently shift from one side to the other side of the tractor.

When a tractor is equipped with the integrated guidance system of the invention, after the completion of the first circumferential cut around the edges of the field, the computer has enough information in its memory to take over steering along the uncut crop and keeping the mower full, and at the end of the field, to lift and swing the mower to the opposite side and align it for the next pass. The computer monitors speed, transmission setting, steering, and orientation of the towed mower by means of sensors associated with each function, and the recorded information provided by the GPS gives the computer all the information needed on the size and shape of the field and what portion of the crop is uncut. The tractor's control module then uses the information to control conventional electro-hydraulic valves for control of the main functions of the tractor and the towed implement. On the other hand, the operator can also maintain any portion of the control desired.

In the fully automatic mode, the apparatus makes one or more additional circumferential cuts, each offset inward toward the center of the field, until the ends of the field have been cut by an amount sufficient, as determined by the operator, usually two to four rounds, to permit a full turn-around of the tractor, including the room needed for movement of the towed implement to the opposite side of the tractor, within the previously cut rows at the end of the field. The computer then automatically steers the mower and the tractor and sets the towed implement to cut the rest of the field in the conventional parallel straight cuts with the operator only controlling the turning at the end of the field.

For this action, the tractor is steered in exactly parallel lines as it moves from one end of the field to the other while the towed implement is maintained in the exact orientation, as determined by its sensors and controlled by the computer, to make the appropriate cut with minimum overlap of the preceding cut while maximizing the width cut by the mower.

Then, as the apparatus approaches the end of the field, the control module, based on the information in regard to previous cuts stored in the computer, controls the lift of the cutting apparatus at the exact time to cut the last of the standing crop in the row, but before the cutting apparatus can interfere with the windrow from the previously cut cross path in the headlands. The control module then causes the center-pivot tongue to swing the towed implement around to the opposite side of the tractor. This swinging action must be timed quite accurately relative to the motion of the tractor because the towed implement must be ready to resume its operation on the opposite side of the tractor when the tractor approaches the uncut crop after turning around at the end of the field. However, the towed implement must also be kept clear of the field boundary as the towed implement moves from the trailing outrigger position on one side of the tractor to the other side.

As the towed implement, such as a mower, is realigned in the position on the opposite side of the tractor, the control module puts it back into operation just as it reaches the uncut crop in the field. The control module then resets the tractor transmission and brings the tractor back up to a speed appropriate for the long straight run down the field during which time the control module and GPS maintain the apparatus in perfect position relative to the previous cut to maintain a full cut with minimum overlap.

It is likely that some operator intervention will be required, particularly at the end of field transitions or to avoid obstacles in the field, so the apparatus of the invention does permit the operator to take over steering control and leave the computer in control of other functions, particularly those involving the towed implement such as moving it to the opposite side of the tractor, and lifting and lowering it.

However, the present invention takes many of the tractor controls for a swing type implement to a new level of automation that permits significant improvement in operation, productivity, and efficiency.

DETAILED DESCRIPTION OF THE INVENTION

Figure 1:
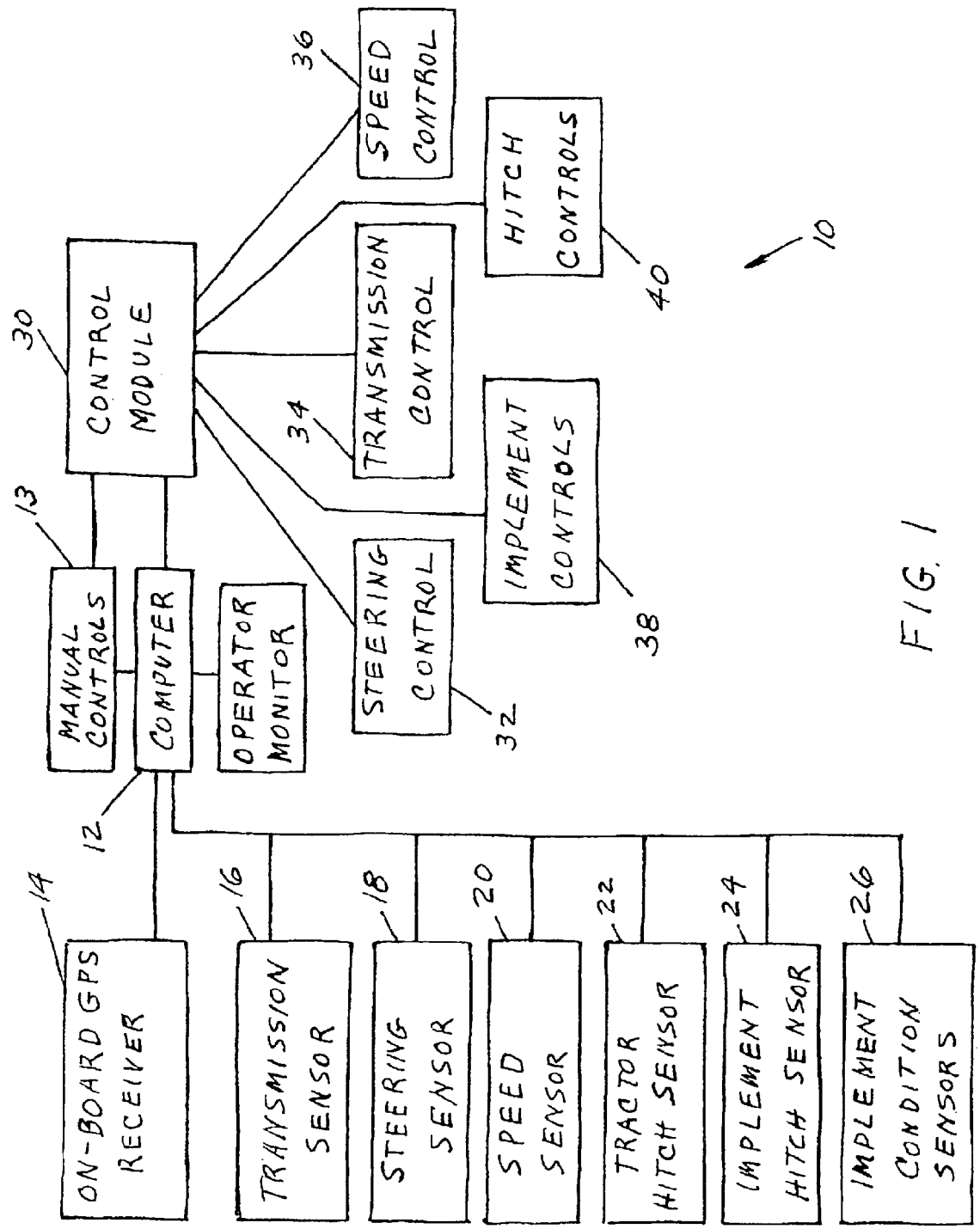
FIG. 1 is a block diagram of the preferred embodiment of the invention.

FIG. 1 is a block diagram of automatic control system 10 of the preferred embodiment of the invention in which computer 12 receives and records information from GPS receiver 14 and sensors 16–26. Computer 12 can then determine exactly what portion of the field has been worked, the present location of the tractor and the towed implement, and the most efficient movements to complete the procedures on the field.

Computer 12 then sends control instructions to control module 30. Typically, control module 30 controls a group of computer operated implement electro-hydraulic controls 38 in the hydraulic system of the tractor. Conventional tractor controls are operated in the same manner, so that the only difference is that computer 12 supplies the signal, for instance, to control hydraulic steering control 32 rather than an operator generating a similar control signal with a steering wheel. Similarly, computer 12 sends signals to control module 30 which controls transmission settings through transmission control 34, speed through speed control 36, implement cutting turning and lowering through implement control 38, and hitch movement through hitch control 40.

All of these various controls are convention in the sense that the controls usually respond to operator actions, such as using a selector for choosing the appropriate transmission setting or moving a lever to swing the hitch to move the towed implement from one side of the tractor to the other or to adjust the distance behind the tractor at which the implement is being towed.

Furthermore, all the manual controls 13 remain on the tractor and functioning for use whenever they are desired and for safety considerations.

Actually, it is the sensors and the use of GPS information which are unique additions to the apparatus of the invention. Conventionally tractors include visual indicators of such factors as speed, transmission setting, and implement status, and the implement position that is determined by the hitch angle as viewed directly by the operator, but for the present invention such information is converted into electrical signals. Each sensor must therefore produce an electrical signal that can be received by the computer.

Many of these sensors are conventionally available. Thus, the steering sensor could be an optical encoder or rotary potentiometer and the transmission status sensor is a linear potentiometer as is the speed sensor. The implement condition sensor, to indicate, for instance, if the mower cutting apparatus is up or down can be something as simple as a conventional electrical limit switch that changes its condition depending upon whether the cutting assembly is in contact with the switch, or the implement condition can be determined by means of the last control signal from implement controls 38.

However, there is no conventional sensor available for the orientation of the towed mower conditioner. To generate this information, two rotational hitch sensors, 22 and 24, such as rotary potentiometers or optical encoders, are used, and their output is interpreted by the computer to indicate the orientation and location of the towed implement. Another option is to measure the extension of the hitch hydraulic cylinder that swings the towbar of the towed implement. This is accomplished by means of a linear transducer or other linear measurement device.

Figure 2:
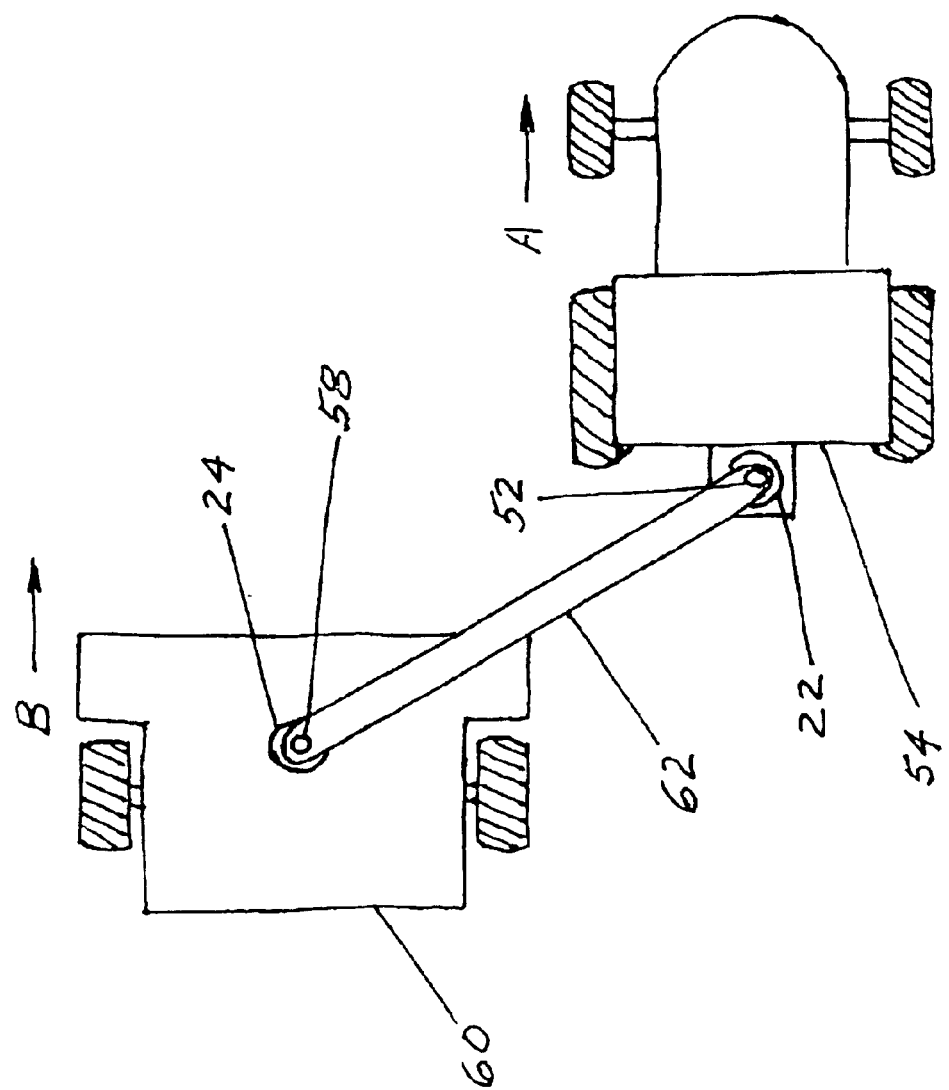
FIG. 2 is a schematic top view of the preferred embodiment of the invention showing the location of the implement orientation sensors.

FIG. 2, which is a schematic top view of the preferred embodiment of the invention shows the location of the towed implement orientation sensors. One sensor, tractor hitch sensor 22, is located at tractor hitch 52, and the second sensor, implement hitch sensor 24, is located at implement hitch 58 on towed implement 60. Tractor hitch sensor 22 and implement hitch sensor 24 provide unique information for every rotational position of tow bar 62 on tractor 54 and implement 60, and the task is made simpler because the rotation is limited to considerably less than 360 degrees on both tractor 54 and towed implement 60.

It is clear that the angle of towbar 62 relative to the direction of motion of tractor 54 (arrow A) and relative to the direction of motion of towed implement 60 (arrow B) determines the orientation of the towed implement relative to the tractor and their relative directions of motion. For example, as pictured in FIG. 2, with towbar 62 at tractor hitch 52 at a clockwise angle of 300 degrees to the tractor motion and towbar 62 at implement hitch 58 at a clockwise angle of 60 degrees to the implement motion, the units are running parallel with the towed implement on the left of the tractor. This would be a typical orientation when the tractor and implement are following the edge of a previous path down the length of the field. Similarly, if the clockwise angle of towbar 62 to tractor motion A were 120 degrees and the clockwise angle of towbar 62 to implement motion B were 300 degrees, the units would be running parallel to each other with the towed implement to the right of the tractor.

However, as towed implement 60 is moved between the orientations of these two examples, as it must be at the end of the field, both these angles go through a continuous change as the tractor and towed implement are turned around.

It should be understood that the means for rotating towbar 62 around tractor hitch 52 and for rotating towed implement 60 around its hitch 58 connecting it with towbar 62 are quite conventional. The device usually used is a hydraulic cylinder interconnecting the frame of the machine to a point on the towbar near the hitch so that, as the cylinder is extended, it moves that point on the towbar through the entire desired angular change.

There are several types of sensors that can furnish the rotational information needed for computer 12. The simplest is perhaps a simple potentiometer, that changes its resistance value as its axis is rotated. However there are many others with varying degrees of sophistication, including magnetic and optical sensors. Also, as previously mentioned, the linear extension of the hydraulic cylinder swinging the towbar can also be monitored. The particular type of sensor used is not important as long as it provides computer 12 with unique information that correlates to the angle of towbar 62 at each hitch.

With computer 12 receiving GPS information that tells it exactly where the tractor is; with the information in the computer memory about where the tractor has been and what it has previously done; with information about the status of all the current functions of the tractor and the towed implement; and having been previously programmed in regard to the task required, it is understandable that the present invention can automatically work a crop field after only a single run around the circumference of the field. What may be even more unusual is that, with all the information in its computer memory essentially providing a map, a machine can be brought back to that same field at a later time and work it again without further input.

The particular benefit of the present invention is that, by using the GPS information recorded in the computer, the cutting action of a towed mower can be stopped at exactly the moment when it will have cut the last of the standing crop in the path of the mower but before the mower cuts across the first windrow that the mower comes to in the headlands. Furthermore, as the operator turns the tractor around, the invention automatically swings the mower to the other side of the tractor while avoiding the edge of the field and any barriers there. Then, without any action on the part of the operator, and again using the GPS information in the computer, the mowing action is automatically restarted at the precise time when it will avoid cutting through the last windrow in the headlands but still cut the edge of the standing crop.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, although the example of a towed mowing machine has been used in the preferred embodiment, virtually any type of towed machine can be operated by the apparatus of the invention.

What is claimed as new and for which Letters Patent of the United States are desired to be secured is:

1. An apparatus for automatically controlling an implement towed by a farm machine comprising:

a computer on board the farm machine that is capable of receiving information from several sources, recording that information, and controlling multiple functions of the farm machine and the towed implement based on the information received, wherein the computer is programmed to record the previous movements of the farm machine and the portion of a farm field that has not yet been worked, and to automatically direct the towed implement to work the portion of the farm field that has not previously been worked;

a Global Positioning System Receiver interconnected with and transmitting to the computer information on the location of the farm machine;

implement condition and position sensors interconnected with and transmitting to the computer information on the status of the towed implement and the position of the towed implement relative to the farm machine;

a control module interconnected with and receiving control signals from the computer;

an implement control apparatus controlling the actions of the towed implement and the position of the towed implement relative to the farm machine and interconnected with and receiving control signals from the control module; and a group of manual controls interconnected with the control module and capable of substituting manual control signals for each of the signals generated by the computer.

2. An apparatus for automatically controlling an implement towed by a tractor comprising:

a computer on board the tractor that is capable of receiving information from several sources, recording that information, and controlling multiple functions of the tractor and the towed implement based on the information, wherein the computer is programmed to record the previous movements of the tractor and the portion of a farm field that has not yet been worked, and to automatically direct the towed implement from one side to the other side of the tractor;

a Global Positioning System Receiver interconnected with and transmitting information on the location of the tractor to the computer;

implement condition sensors interconnected with and transmitting to the computer information on the status of the towed;

a control module interconnected with and receiving control signals from the computer;

implement control apparatus controlling the actions of the towed implement and the position of the towed implement relative to the tractor and interconnected with and receiving control signals from the control module;

a group of manual controls interconnected with the control module and capable of substituting manual control signals for each of the signals generated by the computer;

a tractor hitch on the tractor for attaching to the tractor a towbar for towing an implement;

an implement hitch on the towed implement for connecting the farm implement to the towbar;

a tractor hitch sensor interconnected with and transmitting to the computer information on the angular orientation of the towbar to the direction of movement of the tractor; and an implement hitch sensor interconnected with and transmitting to the computer information on the angular orientation of the towbar to the direction of movement of the implement.

3. The apparatus of claim 2 wherein the tractor and hitch sensors are potentiometers.

4. A method of automatically controlling a towed implement connected to a tractor with a towbar comprising:

using a Global Positioning System receiver interconnected with and transmitting information on the location of the tractor to a computer on board the tractor;

recording the Global Positioning System location information in the computer; and controlling the position of the towed implement based on information the computer receives from multiple sensors reading the tractor and implement functions and sensors reading the angular orientation of the towbar to the directions of motion of the tractor and the farm implement.

5. The method of claim 4 further including using a computer program to record the previous movements of the tractor and the implement and the portion of a farm field that has not yet been worked, and to automatically activate the implement when the implement is located over the portion of the farm field that has not previously been worked.

6. A method of automatically controlling a farm machine with an attached implement comprising:

using a Global Positioning System receiver interconnected with and transmitting information on the location of the farm machine to a computer on board the farm machine;

recording the Global Positioning System location information in the computer; and controlling the position and status of the implement based on information the computer receives from multiple sensors reading the farm machine and implement functions and the position of the implement relative to the farm machine.

7. The method of claim 6 further including using a computer program to record the previous movements of the farm machine and the portion of a farm field that has not yet been worked, and to automatically activate the implement when the implement is located over the portion of the farm field that has not previously been worked.

* * * * *